US009288172B2

(12) United States Patent
Murakami (10) Patent No.: US 9,288,172 B2
(45) Date of Patent: Mar. 15, 2016

(54) ACCESS RESTRICTION DEVICE, ACCESS RESTRICTION METHOD, COMPUTER READABLE STORAGE MEDIUM (71) Applicant: FUJITSU LIMITED, Kawasaki-shi, Kanagawa (JP)

(72) Inventor: Yusuke Murakami, Nagano (JP)

(73) Assignee: FUJITSU LIMITED, Kawasaki (JP)

( * ) Notice: Subject to any disclaimer, the term of this patent is extended or adjusted under 35 U.S.C. 154(b) by 400 days.

(21) Appl. No.: 13/856,646

(22) Filed: Apr. 4, 2013

(65) Prior Publication Data

US 2013/0227043 A1 Aug. 29, 2013

Related U.S. Application Data (63) Continuation of application No. PCT/JP2011/074360, filed on Oct. 21, 2011.

(30) Foreign Application Priority Data

Oct. 22, 2010 (JP) ................................ 2010-236987

(51) Int. Cl.
*G06F 15/16* (2006.01)
*H04L 12/58* (2006.01)
(52) U.S. Cl.
CPC .............. *H04L 51/08* (2013.01); *H04L 51/063* (2013.01); *H04L 51/12* (2013.01)
(58) Field of Classification Search
CPC ........................................... H04L 51/08–51/18
See application file for complete search history.

(56) References Cited

U.S. PATENT DOCUMENTS

| 6,453,338 B1 | 9/2002 | Shiono |
| 2007/0038702 A1* | 2/2007 | Taylor et al. ................... 709/206 |
| 2009/0149205 A1* | 6/2009 | Heredia et al. ................ 455/466 |
| 2009/0265439 A1 | 10/2009 | Nakashiro et al. |

FOREIGN PATENT DOCUMENTS

| JP | 11-232197 | 8/1999 |
| JP | 2001-22678 | 1/2001 |
| JP | 2002-330173 | 11/2002 |

(Continued)

OTHER PUBLICATIONS

Japanese Office Action mailed Apr. 1, 2014 in corresponding Japanese Patent Application No. 2012-539789.

(Continued)

*Primary Examiner* — Brendan Higa
(74) *Attorney, Agent, or Firm* — Staas & Halsey LLP (57) ABSTRACT An access restriction device including a processor; and a memory. The processor executes: receiving an email from a transmission source; specifying including analyzing, when a file is attached to the email, information in the file, and specifying a character string from the file; executing including specifying, from a storing unit in which a character string is associated with an access restriction process, an access restriction process that is associated with the character string specified at the specifying the character string, and executing the specified access restriction process on the file; and sending including attaching, instead of the file attached to the email, the file that has been subjected to the access restriction process at the executing to the email, and sending the email to which the file subjected to the access restriction process is attached to a transmission destination of the email.

20 Claims, 9 Drawing Sheets (56) References Cited

FOREIGN PATENT DOCUMENTS

| | | |
|---|---|---|
| JP | 2004-302693 | 10/2004 |
| JP | 2004-362129 | 12/2004 |
| JP | 2005-285111 | 10/2005 |
| JP | 2007-200276 | 8/2007 |
| JP | 2008-90716 | 4/2008 |
| JP | 2009-80847 | 4/2009 |
| JP | 2009-145955 | 7/2009 |
| JP | 2009-182783 | 8/2009 |
| JP | 2010-3065 | 1/2010 |
| JP | 2010-21746 | 1/2010 |
| JP | 2010-26767 | 2/2010 |
| JP | 2010-233117 | 10/2010 |
| JP | 2012-94110 | 5/2012 |

OTHER PUBLICATIONS

International Search Report of PCT/JP2011/074360 mailed Dec. 6, 2011.

* cited by examiner

ACCESS RESTRICTION
INFORMATION MASTER  ⌐108

| KEY CHARACTER STRING | ACCESS RESTRICTION INFORMATION |
|---|---|
| DDD PROJECT | abcdef |
| INTRODUCE NEW PRODUCT | ghijklm |
| NEW TECHNOLOGY WORKING GROUP | nopqr |
| ⋮ | ⋮ |

FIG.7B

KEY USE DESTINATION
MASTER  ⌐109

| KEY CHARACTER STRING | DESTINATION INFORMATION |
|---|---|
| DDD PROJECT | aaaa@maru.example.com |
| INTRODUCE NEW PRODUCT | bbbb@sankaku.example.com |
| INTRODUCE NEW PRODUCT | cccc@shikaku.example.com |
| ⋮ | ⋮ |

FIG.8

ACCESS RESTRICTION DEVICE, ACCESS RESTRICTION METHOD, COMPUTER READABLE STORAGE MEDIUM

CROSS-REFERENCE TO RELATED APPLICATIONS

This application is a continuation of International Application No. PCT/JP2011/074360, filed on Oct. 21, 2011 which claims the benefit of priority of the prior Japanese Patent Application No. 2010-236987, filed on Oct. 22, 2010 and designating the U.S., the entire contents of which are incorporated herein by reference.

FIELD

The embodiments discussed herein are directed to an access restriction device, an access restriction method, and a computer readable storage medium.

BACKGROUND

It has become common in recent years to send emails to their destination with files attached. When the emails are sent, the attached files are encrypted at the transmission source depending on their confidentiality level. The transmission source sends, to the transmission destination, emails to which encrypted files are attached and separately notifies the transmission destination of the encryption information.

There are known technologies for encrypting emails to which files are attached. For example, there is a known technology for, if a file is attached to an email that is transmitted from the transmission source to the transmission destination, having the mail server automatically encrypt the attached file using a policy that conforms to the transmission destination. The transmission destination has already been notified of the encryption key and the file attached to the email is decoded at the transmission destination with this encryption key. With this technology, it is possible to reduce the time and effort needed to perform the encryption process and prevent leakage of information due to encrypting being forgotten.

Patent Document 1: Japanese Laid-open Patent Publication No. 2010-21746
Patent Document 2: Japanese Laid-open Patent Publication No. 11-232197
Patent Document 3: Japanese Laid-open Patent Publication No. 2002-330173
Patent Document 4: Japanese Laid-open Patent Publication No. 2009-145955
Patent Document 5: Japanese Laid-open Patent Publication No. 2010-21746
Patent Document 6: Japanese Laid-open Patent Publication No. 2004-362129

With the technology described above, the file to be attached to an email is encrypted by the mail server in accordance with the transmission destination of the email. Consequently, if there is a file that is not to be attached to an email and that is not to be sent to the transmission destination but that is erroneously attached to an email, the file is still encrypted in accordance with the transmission destination and sent. At this point, the file that is erroneously sent to the transmission destination can be decoded with the encryption key that has already been sent, as a notification, to the transmission destination.

As described above, with the technology in which the file attached to an email is encrypted by the mail server in accordance with the transmission destination, there is a problem in that a file that is erroneously attached to an email due to an error at the transmission source can be read at the transmission destination even if the transmission source does not want to permit it to be read. Furthermore, with the conventional technology, if an email with an attached file is sent, it is not possible to allow only a user who has the reading right to read the attached file.

SUMMARY

According to an aspect of an embodiment, an access restriction device including a processor; and a memory. The processor executes: receiving an email from a transmission source; specifying including analyzing, when a file is attached to the email, information in the file, and specifying a character string from the file; executing including specifying, from a storing unit in which a character string is associated with an access restriction process, an access restriction process that is associated with the character string specified at the specifying the character string, and executing the specified access restriction process on the file; and sending including attaching, instead of the file attached to the email, the file that has been subjected to the access restriction process at the executing to the email, and sending the email to which the file subjected to the access restriction process is attached to a transmission destination of the email.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings.

[a] First Embodiment

Figure 1:
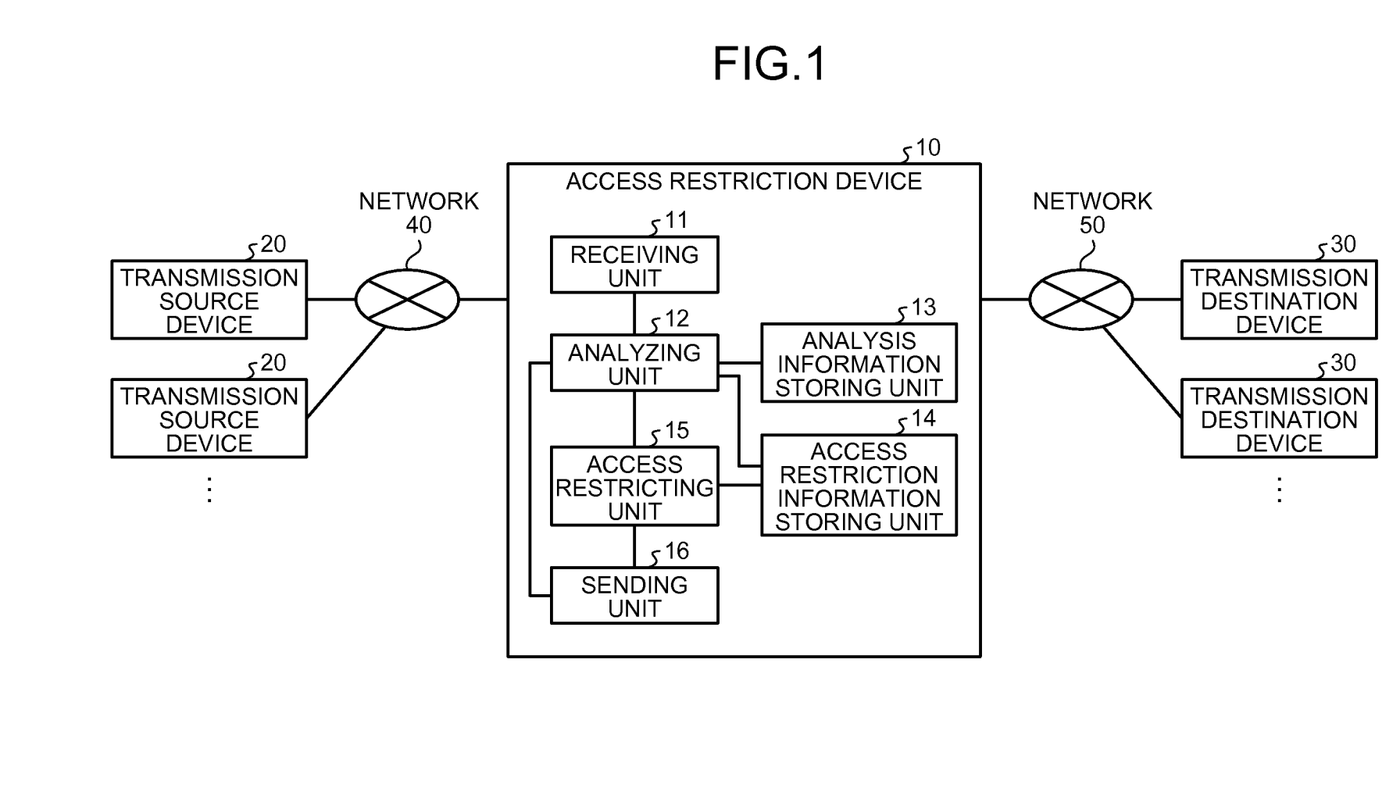
FIG. 1 is a schematic diagram illustrating an example configuration of a mail system according to a first embodiment.

FIG. 1 is a schematic diagram illustrating an example configuration of a mail system according to a first embodiment.

In the mail system illustrated in FIG. 1, an access restriction device 10 is a device, such as a gateway server or a mail server, that manages the emails of an organization, such as a company. In the first embodiment, the access restriction device 10 is assumed to be a gateway server. The gateway server is a device that archives emails sent from an organization, filters out spam in emails received from external organizations, and filters emails, in accordance with the security policy of the organization, that are sent from the organization to the external organizations.

Transmission source devices 20 are computers belonging to an organization, in which emails are managed by the access restriction device 10 and are devices used by transmission-source email users according to the first embodiment. Transmission destination devices 30 are external computers in which emails are managed by the access restriction device 10 and are devices used by transmission-destination email users according to the first embodiment. In the first embodiment, because users that use computers at an organization send emails to users that use computers at the external organizations, the computers are referred to as the transmission source devices 20 and the transmission destination devices 30, respectively. In accordance with an operation performed by a user, the transmission source devices 20 and the transmission destination devices 30 create emails to be sent, transmit and receive emails, and display and output outgoing and incoming emails stored in the mail server. The transmission source devices 20 send emails to the access restriction device 10 via a network 40, such as a LAN. The emails are delivered to the external transmission destination devices 30 from the access restriction device 10 via a network 50, such as the Internet.

The access restriction device 10 has a function of executing a process for automatically restricting access to a file that is attached to an email sent from a device in an organization to a device at an external organization. It is assumed that the access restriction process according to the first embodiment includes a process for restricting the attached file from being read. For example, it is assumed that the access restriction process includes an access restriction process due to a file being encoded with an encryption key or an access restriction process that uses a password, which is a simple security technology, being assigned to a file. If a file is encrypted with an encryption key, a user who has reading authorization for the file can read the file by decoding the file with the encryption key (or a decoding key) that has separately been acquired. Furthermore, if a password is set to the file, a user who has reading authorization for the file can read the file by inputting the password, which has separately been acquired. In contrast, for a user who does not have reading authorization for the file, even if the user receives an erroneously attached file for which the user does not have reading authorization, the user is not able to read the file because the user does not know the encryption key nor the password. Consequently, access restriction with respect to the attached file is implemented. Furthermore, it is assumed that the access restriction process also includes an access restriction process for storing the attached file in the data storage location to which only users who have reading authorization can access. In such a case, the terminal logged onto by a user who has the reading authorization can access the data storage location and thus the user can read the file. However, a terminal logged onto by a user who does not have reading authorization is not able to access the data storage location and thus the user is not able to read the file. In the first embodiment, it is assumed that the access restriction information is an encryption key.

In the access restriction process for assigning a password to a file, the file can be read, at the transmission destination device 30, by a user correctly inputting a password. For example, an application opens the file only when the password assigned to the file matches the password that was input by the user. If the user does not know the correct password, the user is not able to open the file at the transmission destination device 30.

The access restriction device 10 includes a receiving unit 11, an analyzing unit 12, an analysis information storing unit 13, an access restriction information storing unit 14, an access restricting unit 15, and a sending unit 16.

The receiving unit 11 receives an email sent from the transmission source device 20. The receiving unit 11 is an example of a receiving unit that receives an email from a transmission source.

The analyzing unit 12 analyzes an email to be sent. For example, the analyzing unit 12 analyzes the header of an email to extract the transmission source address, the transmission destination address, and the like or analyzes the body of an email to extract the email main body, the attached file, and the like.

Furthermore, if a file is attached to an email, the analyzing unit 12 analyzes the body of the file to specify, from the analysis result, a user who has reading authorization for the file. Alternatively, if a file is attached to an email, the analyzing unit 12 analyzes information (including the body, the properties of the file, header information, and the like) on the file to specify a character string from the file. For example, if a file is attached to an email, the analyzing unit 12 analyzes the file to extract a character string contained in the file. A user having the reading authorization mentioned here includes not only an individual person but also an organization name or a project name. Furthermore, there is already existing software that analyzes a file in accordance with an identifier of the type of file, such as a file for a word processing or a spreadsheet, to extract a character string contained in the file. Furthermore, it may also be possible to use an algorithm that predicts whether a user has reading authorization by analyzing the file.

The information on the analysis result of emails performed by the analyzing unit 12 is stored in the analysis information storing unit 13. The analysis information storing unit 13 is a computer accessible storing unit that stores therein information on the analysis result of the emails.

The access restriction information storing unit 14 is a computer accessible storing unit that stores therein information in which an already registered character string is associated with access restriction information. The access restriction information is information, such as an encryption key or a password, that is used when the access restriction process is performed on a file attached to an email.

The access restricting unit 15 performs, on a file, an access restriction process that is associated with a user who has reading authorization. Alternatively, the access restricting unit 15 specifies, from the storing unit in which a character string is associated with an access restriction process, an access restriction process that is associated with the character string specified by the analyzing unit 12 and performs the specified access restriction process on the file.

For example, the access restricting unit 15 refers to the associated information, which is stored in the access restriction information storing unit 14 by associating the character string with the access restriction information, and acquires access restriction information associated with the character string that is extracted from the file by the analyzing unit 12.

The access restricting unit 15 then performs an access restriction process on a file attached to an email by using the acquired access restriction information. The access restricting unit 15 attaches, instead of the original file, the access restricted file, which is obtained by performing the access restriction on the file attached to the email.

Instead of the file attached to the email, the sending unit 16 attaches the file subjected to the access restriction process to the email and sends it to the transmission destination of the email. For example, the sending unit 16 sends the email with the access restricted file attached to the transmission destination of the email.

Figure 2:
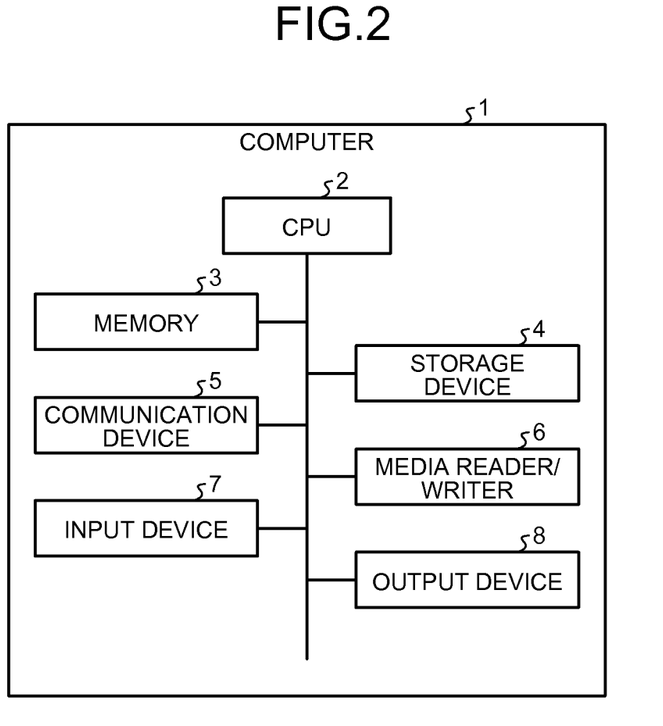
FIG. 2 is a schematic diagram illustrating an example configuration of hardware that implements an access restriction device according to the first embodiment.

FIG. 2 is a schematic diagram illustrating an example configuration of hardware that implements an access restriction device according to the first embodiment.

The access restriction device 10 according to the first embodiment illustrated in FIG. 1 is implemented by a computer 1 that includes, for example, a central processing unit (CPU) 2, a memory 3 corresponding to the maim memory, a storage device 4, a communication device 5, a media reader/writer 6, an input device 7, and an output device 8. The media reader/writer 6 is, for example, a CD-R drive or a DVD-R drive. The input device 7 is, for example, a keyboard or a mouse. The output device 8 is, for example, a display.

The access restriction device 10 and each of the functioning units included in the access restriction device 10 illustrated in FIG. 1 can be implemented by hardware, such as the CPU 2 and the memory 3 included in the computer 1, and by a software program. The program that can be executed by the computer 1 is stored in the storage device 4, read by the memory 3 when the program is executed, and executed by the CPU 2.

The computer 1 can directly read the program from a portable recording medium and execute a process in accordance with the program. Furthermore, every time a program is transferred from a server computer, the computer 1 can sequentially execute a process in accordance with the received program. Furthermore, the program can be stored in a recording medium that can be read by the computer 1.

Figure 3:
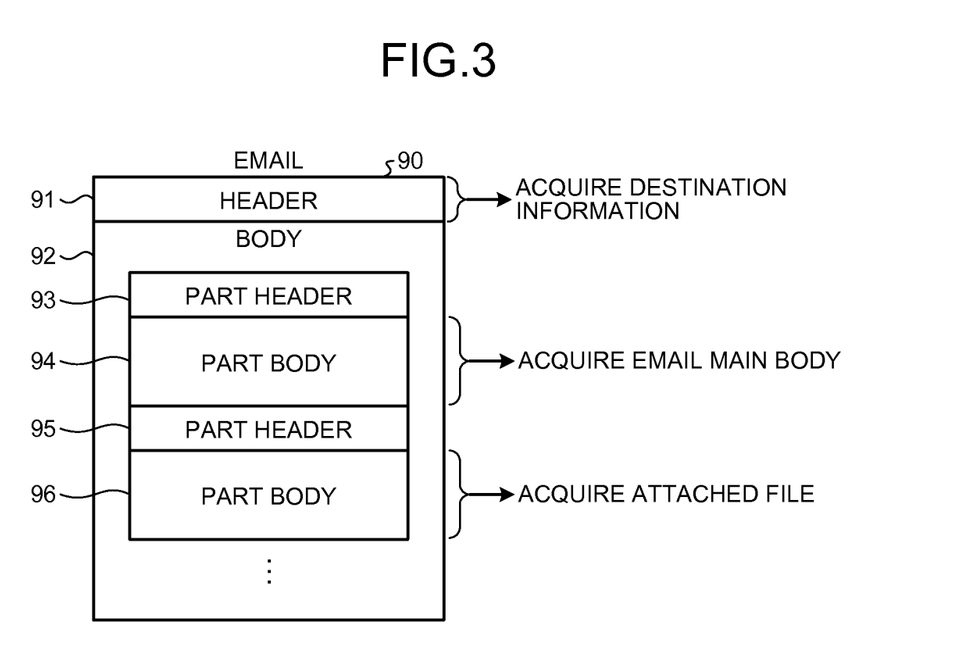
FIG. 3 is a schematic diagram illustrating an example configuration of email data.

FIG. 3 is a schematic diagram illustrating an example configuration of email data.

An email 90 illustrated in FIG. 3 includes a header 91 and a body 92.

The analyzing unit 12 acquires, for example, destination information from the header 91 of the email 90. The destination information is, for example, a destination email address that specifies the transmission destination.

The body 92 of the email 90 includes a part header 93, a part body 94, a part header 95, and a part body 96.

The part header 93 and the part body 94 are parts of the email main body. The analyzing unit 12 acquires the email main body from the part body 94.

The part header 95 and the part body 96 are parts of the attached file. The analyzing unit 12 acquires an attached file from the part body 96. If there are multiple attached files, the body 92 of the email 90 further includes a part header and a part body of each of the attached files.

Figure 4:
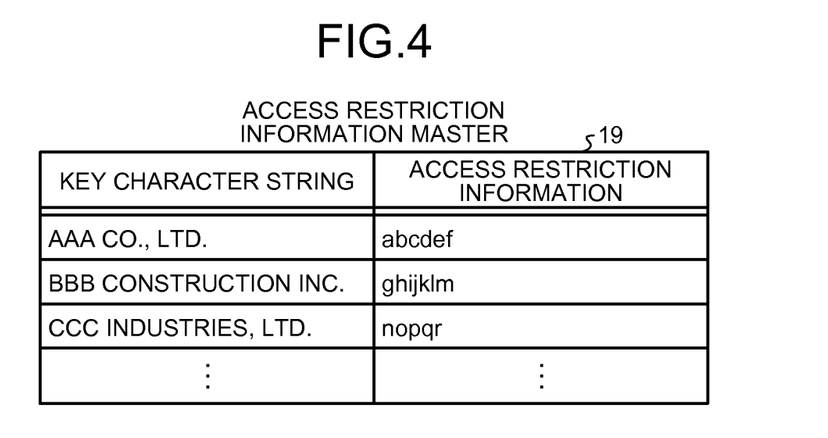
FIG. 4 is a schematic diagram illustrating an example of data stored by an access restriction information storing unit according to the first embodiment.

FIG. 4 is a schematic diagram illustrating an example of data stored by an access restriction information storing unit according to the first embodiment.

An access restriction information master 19 illustrated in FIG. 4 is an example of information stored in the access restriction information storing unit 14 in which a character string is associated with the access restriction information.

The access restriction information master 19 illustrated in FIG. 4 includes information, such as a key character string and access restriction information. The key character string is a character string that has already been registered by a user, such as an administrator of the mail system or a user. The access restriction information is an encryption key or a password that is registered by the user by associating the access restriction information with the key character string or that is automatically created and then registered by associating the access restriction information with the key character string.

In the first embodiment, an access restriction process is performed on a file in accordance with the character string contained in the file. Consequently, when a user registers a character string in the associated information in which character strings are associated with the access restriction information in the access restriction information storing unit 14, the user registers a specific character string assuming that the user at the other end is permitted to read the file. The character string to be registered is information for identifying the correct destination of the file that contains the character string.

In the access restriction information master 19 illustrated in FIG. 4, the corporation names, such as "AAA Co., Ltd.", "BBB Construction Inc.", and "CCC Industries, Ltd.", are registered as key character strings. These key character strings are registered under the assumption that the organization name of the transmission destination is contained in the file attached to an email.

For example, in the access restriction information master 19 illustrated in FIG. 4, the key character string "AAA Co., Ltd." is a character string registered under the assumption that "AAA Co., Ltd." is the destination to which a file is sent. Similarly, a key character string "BBB Construction Inc." is a character string registered under the assumption that "BBB Construction Inc." is the destination to which a file is sent and a key character string "CCC Industries, Ltd." is a character string registered under the assumption that "CCC Industries, Ltd." is the destination to which a file is sent. The encryption information "abcdef" that is associated with the key character string "AAA Co., Ltd." is previously sent, as a notification, to AAA Co., Ltd. Similarly, the access restriction information "ghijklm" associated with the key character string "BBB Construction Inc." is previously sent, as a notification, to BBB Construction Inc. Similarly, the access restriction information "nopqr" associated with the key character string "CCC Industries, Ltd." is previously sent, as a notification, to CCC Industries, Ltd.

In this example, it is assumed that a user creates a file of quotations for AAA Co., Ltd. When the file is created, the user usually takes into consideration the key character string that has been registered in the access restriction information master 19 illustrated in FIG. 4 when inputting the destination of the file, usually, at the beginning. For example, at the beginning, a character string representing "quotation for AAA Co., Ltd." is input to the file. Accordingly, the analyzing unit 12 may start to analyze the file from the beginning part and end the analyzing when the character string has been found.

It is assumed that a user, at the transmission source device 20, attaches the created file to an email and sends the file.

The access restriction device 10 receives the email received from the transmission source device 20 and performs the access restriction process on the file attached to the email. At this time, because the key character string "AAA Co., Ltd." registered in the access restriction information master 19 illustrated in FIG. 4 is extracted from the file attached to the email, the access restriction device 10 performs the access restriction process on the file by using the access restriction information "abcdef", which is associated with the key character string "AAA Co., Ltd.". The access restriction device 10 attaches, instead of the original file, the access restricted file created by using the access restriction information "abcdef" to the email, and sends the email to the transmission destination.

If the destination of the email that contains the access restricted file created by using the access restriction information "abcdef" is AAA Co., Ltd., the transmission destination device 30 belonging to AAA Co., Ltd. can decode the access restricted file, which is attached to the email, with the access restriction information "abcdef" that is previously notified. In contrast, if the destination of an email that contains the access restricted file created by using the access restriction information "abcdef" is BBB Construction Inc., the transmission destination device 30 belonging to BBB Construction Inc. is not able to encode the access restricted file attached to the email with the access restriction information "ghijklm", of which it was previously notified. Specifically, if the electronic file containing the access restricted file created by using the access restriction information "abcdef" is sent to an incorrect destination, it is not possible to decode the file at the transmission destination.

In the access restriction information master 19 illustrated in FIG. 4, the access restriction information is associated with a single key character string; however, the access restriction information may also be associated with the condition containing multiple key character strings. For example, it is possible to register the access restriction information in association with multiple key character strings joined by the and-condition and is possible to perform, when all of the multiple key character strings are extracted from the file, the access restriction process on the file by using the associated access restriction information. Similarly, it is possible to use the condition containing multiple key character strings joined by the or-condition or is possible to use the condition containing a specified character string that is not contained in the file.

Figure 5:
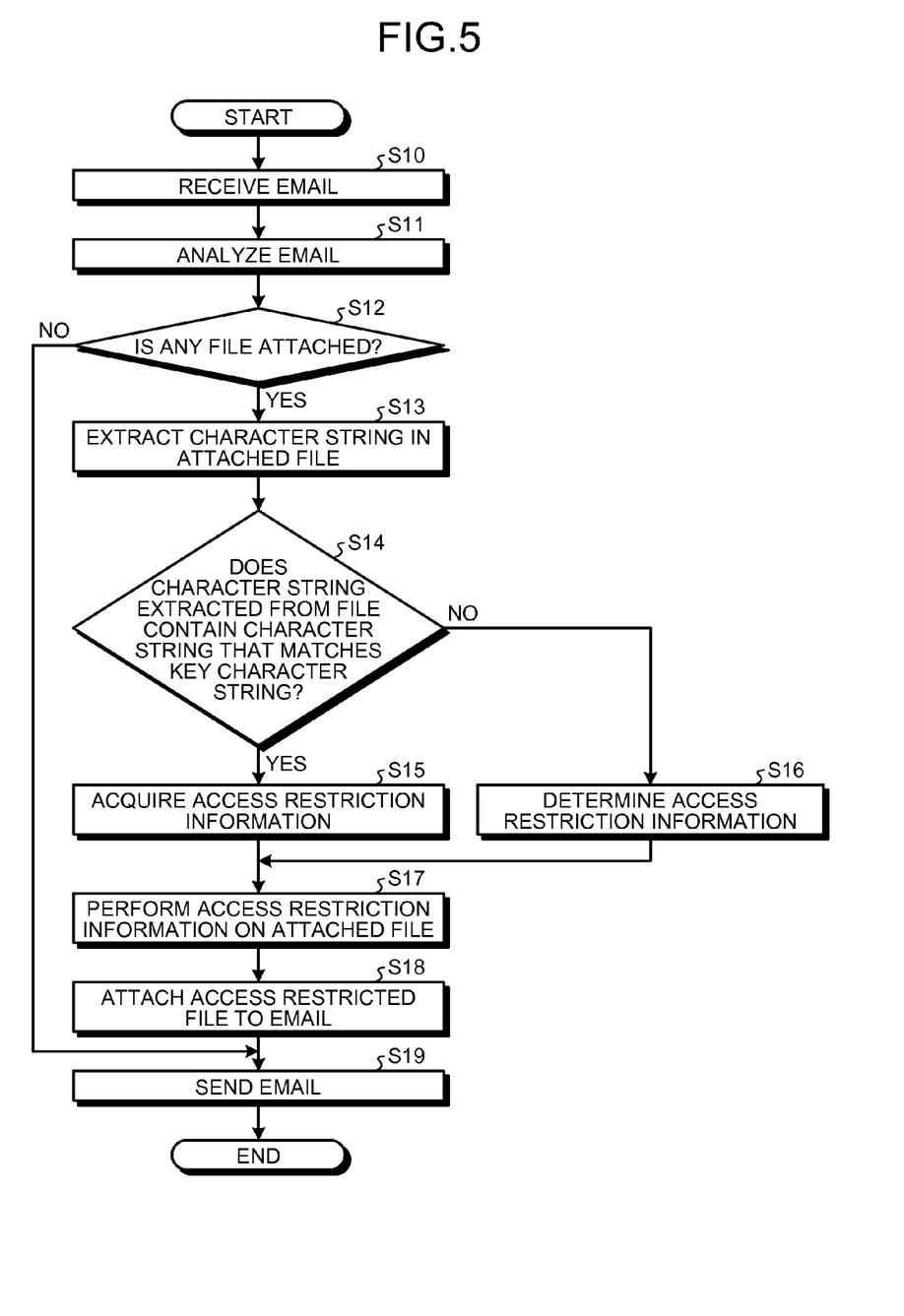
FIG. 5 is a flowchart illustrating the flow of a mail management process performed by the access restriction device according to the first embodiment.

FIG. 5 is a flowchart illustrating the flow of a mail management process performed by the access restriction device according to the first embodiment.

At the access restriction device 10, the receiving unit 11 receives an email sent from the transmission source device 20 (Step S10). In this case, the receiving unit 11 accepts an email received from the transmission source device 20.

The analyzing unit 12 analyzes the received email (Step S11). In this case, the analyzing unit 12 extracts the destination information or an attached file from the email. The information that is extracted in accordance with the analysis is temporarily stored in the analysis information storing unit 13.

The analyzing unit 12 determines whether a file is attached to the email (Step S12).

If a file is not attached to the email (No at Step S12), the sending unit 16 sends the email to the transmission destination (Step S19).

If a file is attached to the email (Yes at Step S12), the analyzing unit 12 extracts the character string from the file attached to the email (Step S13). As a method for extracting a character string, the analyzing unit 12 reads, from the beginning of the file, predetermined amount of information. For example, x number of bytes and y number of lines are set as the amount of information to be read. By reading the information from the beginning, as described above, because the destination of the file is highly likely to be input at the beginning part of the file, the process can be performed at high speed by narrowing down the region from which the character string is extracted.

Then, the analyzing unit 12 extracts, from the read information, a combination of consecutive multiple characters as a character string. The analyzing unit 12 refers to the access restriction information master 19 stored in the access restriction information storing unit 14 and determines whether the character string extracted from the file contains a character string that matches a key character string that has been registered in the access restriction information master 19 (Step S14). Furthermore, for all of the combinations included in the read information, the analyzing unit 12 determines whether there is a character string that matches a key character string registered in the access restriction information master 19.

If a character string that matches a key character string is present (Yes at Step S14), the access restricting unit 15 acquires, from the access restriction information master 19, the access restriction information associated with the key character string that matches the character string extracted from the file (Step S15).

If no character string that matches a key character string is present (No at Step S14), the access restricting unit 15 determines the access restriction information to be used (Step S16). For example, when encryption is performed as an example of the access restriction process, the access restricting unit 15 randomly allocates an encryption key and allocates the allocated encryption key as access restriction information. In this case, the access restriction device 10 notifies the transmission source device 20 of the randomly allocated encryption key and the user at the transmission source separately notifies the transmission destination of the encryption key. If no character string that matches a key character string is present in the file, it may also be possible not to perform the access restriction process on the file.

By using the access restriction information that is acquired from the access restriction information master 19 or that is allocated, the access restricting unit 15 performs the access restriction process on the file attached to the email (Step S17). Instead of the file that has been attached to the email, the access restricting unit 15 attaches the file, which has been subjected to the access restriction, to the email (Step S18). The sending unit 16 then sends the email with the file subjected to the access restriction attached to the transmission destination of the email (Step S19).

As described above, in the access restriction device 10 according to the first embodiment, the access restriction process is performed on the attached file by using the encryption information that is associated with a character string contained in the attached file. The character string and the access restriction information, which are associated with each other, are registered assuming that a user at the other end is permitted to read the file containing the character string. Consequently, with the access restriction device 10 according to the first embodiment, the file attached to the email can be read only at the transmission destination for which the transmission source wants to give permission. Consequently, even if a file is erroneously attached to an email due to an error at the transmission source, the file is not able to be correctly opened at a transmission destination where the transmission source does not want the file to be read.

[b] Second Embodiment

Figure 6:
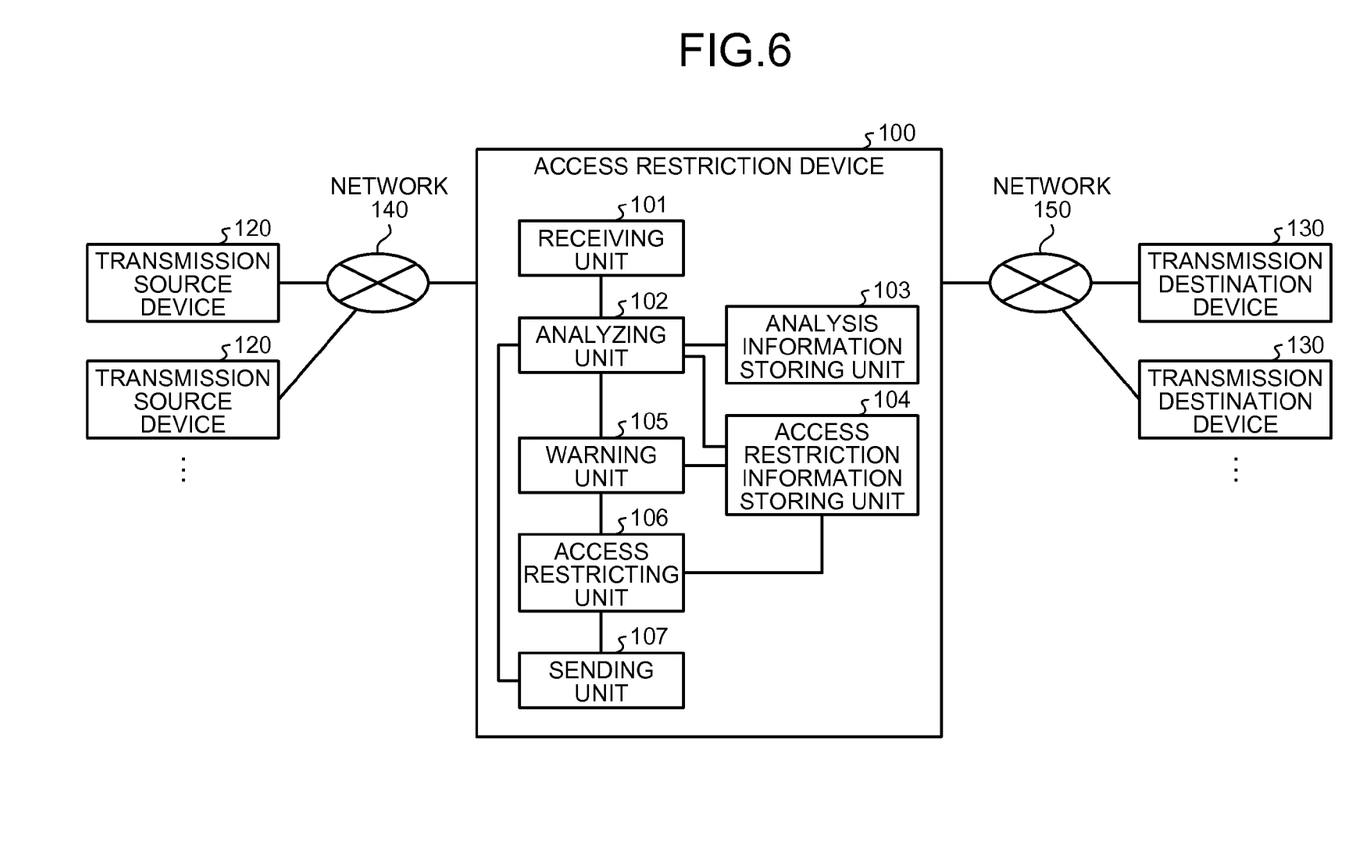
FIG. 6 is a schematic diagram illustrating an example configuration of a mail system according to a second embodiment.

FIG. 6 is a schematic diagram illustrating an example configuration of a mail system according to a second embodiment.

In the mail system illustrated in FIG. 6, an access restriction device 100, transmission source devices 120, transmission destination devices 130, a network 140, and a network 150 correspond to the access restriction device 10, the transmission source devices 20, the transmission destination devices 30, the network 40, and the network 50, respectively, according to the first embodiment illustrated in FIG. 1. An example of the hardware configuration of a computer that implements the access restriction device 100 is the same as that of the computer 1 illustrated in FIG. 2. However, in the second embodiment, it is assumed that the access restriction device 100 is a mail server that has a Webmailer.

In a mail system that uses Webmailer technology, a function of uniquely managing emails is not particularly provided in a computer that is directly operated by a user and a function of managing emails of each computer belonging to a user is concentrated at a mail server. A user accesses the functions of Webmailer included in the mail server by operating the computer to create an email to be sent, to send and receive emails, and to read outgoing/incoming emails stored in the mail server. In the second embodiment, the transmission source device 120 operated by the user accesses the functions of Webmailer included in the access restriction device 100 to create and send an email.

The access restriction device 100 includes a receiving unit 101, an analyzing unit 102, an analysis information storing unit 103, an access restriction information storing unit 104, a warning unit 105, an access restricting unit 106, and a sending unit 107. The functioning units in the access restriction device 100 other than the warning unit 105 correspond respectively to the functioning units having the same name in the access restriction device 10 according to the first embodiment. In the following, for the same processes as those performed in the first embodiment, the description thereof will be omitted and the main description will be of the processes that are different from those of the first embodiment.

The receiving unit 101 receives an instruction to send an email from the transmission source device 120. The email to be sent is created by accessing from the transmission source device 120 and is retained in the access restriction device 100.

The analyzing unit 102 analyzes the email for which there was a send instruction. The email-analysis result containing the destination of the email or information on the attached file is stored in the analysis information storing unit 103. Furthermore, if a file is attached to the email, the analyzing unit 102 analyzes the file and extracts a character string contained in the file.

The access restriction information storing unit 104 stores the information, in which the previously registered character string is associated with the access restriction information, and stores information, in which the previously registered character string is associated with the destination. In the second embodiment, it is assumed that the access restriction information is a password.

The warning unit 105 refers to the associated information stored in the access restriction information storing unit 104 in which the character string is associated with the destination. If the destination that is associated with the character string extracted from the file by the analyzing unit 102 is different from the destination specified from an email analyzed by the analyzing unit 102, the warning unit 105 warns the transmission source.

The access restricting unit 106 refers to the associated information stored in the access restriction information storing unit 104 in which the character string is associated with the encryption information and acquires the encryption information that is associated with the character string and that is extracted from the file by the analyzing unit 102. By using the acquired encryption information, the access restricting unit 106 encrypts the file attached to the email and attaches the access restricted file, instead of the original file, to the email. In the encryption according to the second embodiment, a password is given to the file.

The sending unit 107 sends the email with the access restricted file attached to the transmission destination of the email.

Figure 7A:
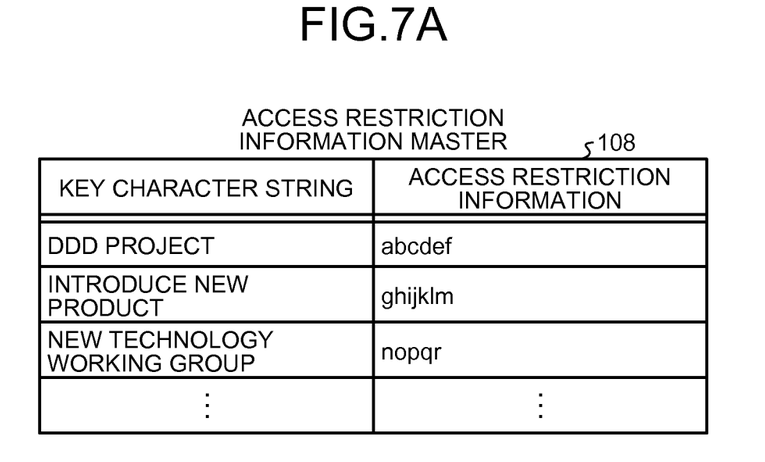
FIGS. 7A and 7B are schematic diagrams illustrating an example of data stored by an access restriction information storing unit according to the second embodiment.
Figure 7B:
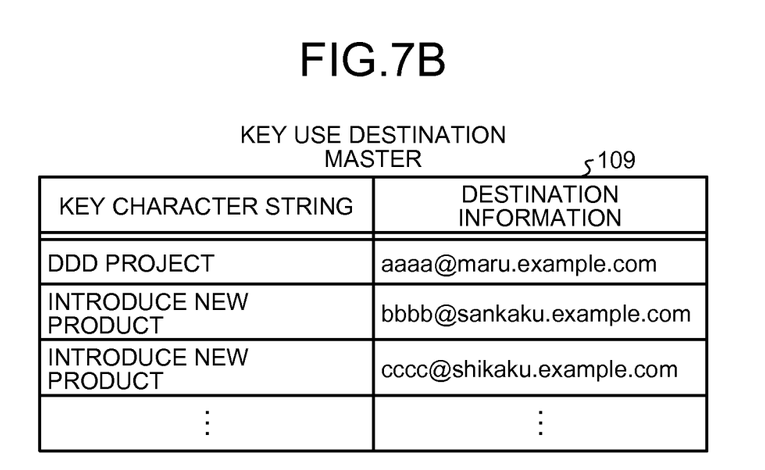

FIGS. 7A and 7B are schematic diagrams illustrating an example of data stored by an access restriction information storing unit according to the second embodiment.

An access restriction information master 108 illustrated in FIG. 7A is an example of information stored in the access restriction information storing unit 104 in which a previously registered character string is associated with access restriction information. A key use destination master 109 illustrated in FIG. 7B is an example of information stored in the access restriction information storing unit 104 in which the previously registered character string is associated with a destination.

The access restriction information master 108 illustrated in FIG. 7A includes information, such as a key character string, a password, and the like. The key character string is a character string that is previously registered by a user, such as an email system administrator or user. The password is access restriction information that is registered by a user associating it with a key character string or access restriction information that is automatically created and registered by associating it with a key character string.

The key use destination master 109 illustrated in FIG. 7B includes information, such as a key character string, destination information, and the like. The key character string corresponds to the key character string in the access restriction information master 108 illustrated in FIG. 7A. The destination information is a destination email address that is registered by a user by associating it with a key character string. When registering destination information in the key use destination master 109, a user, such as an mail system administrator or user, registers destination information assuming that a user at the other end is permitted to read the file containing the associated key character string.

For example, in the access restriction information master 108 and the key use destination master 109 illustrated in FIGS. 7A and 7B, it is assumed that the key character string "DDD project" is a character string registered under the assumption that AAA Co., Ltd. is the destination of the file to be sent. In the key use destination master 109 illustrated in FIG. 7B, the destination information "aaaa@maru.example.com" is a destination email address registered under the assumption that AAA Co., Ltd. is the destination that is permitted to read the file containing the key character string "DDD project". Furthermore, in the key use destination master 109 illustrated in FIG. 7B, "bbbb@sankaku.example.com" and "cccc@shikaku.example.com" are email addresses of BBB Construction Inc. and CCC Industries, Ltd., respectively.

In this case, it is assumed that a user creates a file to be sent to AAA Co., Ltd. The user usually takes into consideration the key character string registered in the access restriction information master 108 illustrated in FIGS. 7A and 7B when creating the file containing the character string of "DDD project". It is assumed that the user accesses the access restriction device 100 by using the transmission source device 120, creates an email to which the created file is attached, and issues an instruction to send the created email.

The access restriction device 100 receives an instruction to send the email from the transmission source device 120 and analyzes the email containing the file attached to the email. The access restriction device 100 refers to the key use destination master 109 illustrated in FIG. 7B. If the destination information associated with the key character string contained in the attached file is different from the destination information of the email, the access restriction device 100 warns the transmission source device 120 indicating that an incorrect file is attached to the email.

For example, if the destination email address of the email is "aaaa@maru.example.com" that indicates AAA Co., Ltd., the destination email address matches the destination information of "aaaa@maru.example.com" that is associated with the key character string in the attached file. Consequently, the access restriction device 100 does not warn the transmission source device 120. If the destination email address of the email is "bbbb@sankaku.example.com" that indicates BBB Construction Inc., the destination email address is different from the destination information "aaaa@maru.example.com" that is associated with the key character string in the attached file. Consequently, the access restriction device 100 warns the transmission source device 120.

Figure 8:
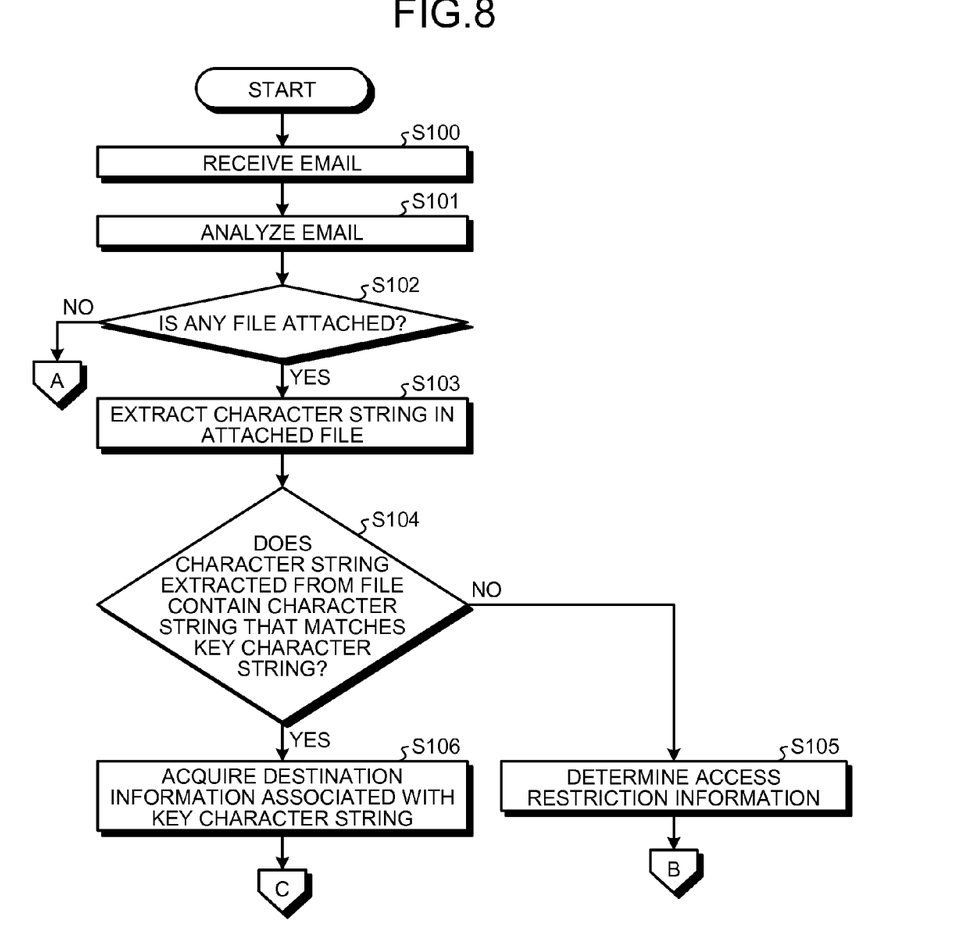
FIG. 8 is a flowchart illustrating the flow of an access restriction process performed by the access restriction device according to the second embodiment.
Figure 9:
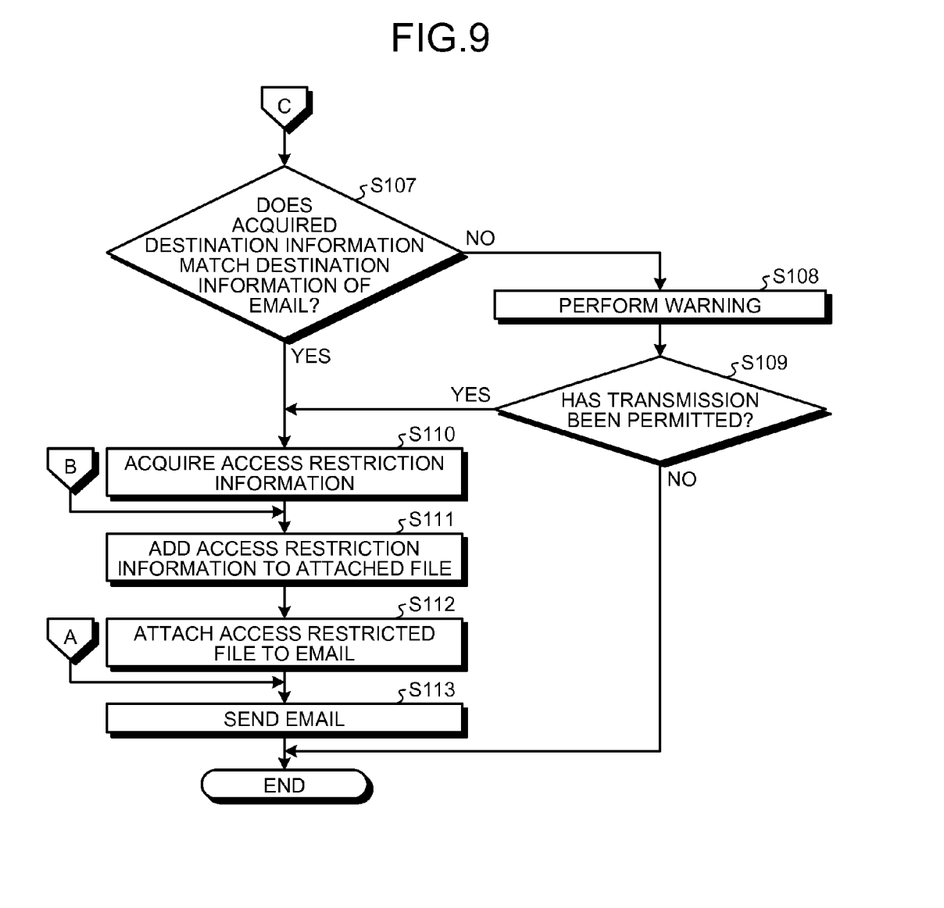
FIG. 9 is a flowchart illustrating the flow of the access restriction process performed by the access restriction device according to the second embodiment.

FIGS. 8 and 9 are flowcharts each illustrating the flow of an access restriction process performed by the access restriction device according to the second embodiment.

In the access restriction device 100, the receiving unit 101 receives an email that is sent from the transmission source device 120 (Step S100). In this case, the receiving unit 101 receives an instruction to send the email from the transmission source device 120.

The analyzing unit 102 analyzes the email in which the send instruction is received (Step S101). In this case, the analyzing unit 102 extracts the destination information or an attached file from the email. The information that is extracted from the analysis is temporarily stored in the analysis information storing unit 103.

The analyzing unit 102 determines whether any attached file is contained in the email (Step S102).

If an attached file is not contained in the email (No at Step S102), the sending unit 107 sends the email to the transmission destination (Step S113).

If an attached file is contained in the email (Yes at Step S102), the analyzing unit 102 extracts a character string from the file attached to the email (Step S103). The analyzing unit 102 refers to the access restriction information master 108 stored in the access restriction information storing unit 104 and determines, in the character string extracted from the file, whether a character string is present that matches the key character string that is registered in the access restriction information master 108 (Step S104).

If no character string that matches the key character string is present (No at Step S104), the access restricting unit 106 determines access restriction information (Step S105) and proceeds to Step S111. For example, the access restricting unit 106 randomly allocates a password and allocates the allocated password as the access restriction information. In this case, the access restriction device 100 notifies the transmission source device 120 of the randomly allocated password and the transmission source separately notifies the transmission destination of the password. If no character string that matches the key character string is present in the file, it may also be possible not to perform the access restriction process on the file.

If a character string that matches the key character string is present (Yes at Step S104), the analyzing unit 102 acquires, from the key use destination master 109 stored in the access restriction information storing unit 104, the destination information associated with the key character string that matches the character string extracted from the file (Step S106). The analyzing unit 102 determines whether the destination information acquired from the key use destination master 109 matches the destination information of the email (Step S107).

If there is a match (Yes at Step S107), the access restriction device 100 proceeds to Step S110.

If there is not a match (No at Step S107), the warning unit 105 warns the transmission source (Step S108). Examples of the warning include a warning indicating that a file attached to an email is incorrect or a warning indicating that the destination of an email with a file attached may possibly be incorrect.

In this case, it is assumed that the transmission source device 120 displays a warning on a display screen and allows a user to select whether to permit the sending of the email for which there is a send instruction. The access restriction device 100 determines, at the transmission source device 120, whether a user permits the sending of the email (Step S109). If the user does not permit the sending of the email (No at Step S109), the access restriction device 100 stops sending the email. If the user permits the sending of the email (Yes at Step S109), the access restriction device 100 proceeds to Step S110.

The access restricting unit 106 acquires, from the access restriction information master 108 stored in the access restriction information storing unit 104, the access restriction information associated with the key character string that matches the character string extracted from the file (Step S110).

The access restricting unit 106 adds, to the file that is to be attached to the email, the access restriction information that is acquired from the access restriction information master 108 or that is allocated (Step S111). Instead of the file that was originally attached to the email, the access restricting unit 106 attaches, to the email, the file subjected to the access restriction (Step S112). The sending unit 107 sends the email with the file subjected to the access restriction attached to the transmission destination of the email (Step S113).

As described above, in the access restriction device 100 according to the second embodiment, if the destination associated with the character string contained in the attached file is different from the destination of the email, the access restriction device 100 warns the transmission source device 120. With the access restriction device 100 according to the second embodiment, in addition to the advantages of the first embodiment described above, a user of the transmission source device 120 can check the possibility of a file erroneously being attached to an email before the email is actually sent.

[c] Third Embodiment

In the above explanation, a description has been given of the embodiments according to the present invention; however, the embodiments are not limited thereto and can be implemented with various kinds of embodiments other than the embodiments described above. Therefore, another embodiment will be described below.

For example, in the access restriction device 10 according to the first embodiment or in the access restriction device 100 according to the second embodiment, it may also be possible to use a structure in which, when the reliability of the access restriction information drops, the registered access restriction information is automatically made invalid.

For example, a user may sometimes possibly notify a user at the other end of access restriction information, which was used for an access restriction process that is performed on the file attached to an email by using the same email or another email. With the access restriction device that uses this structure in which access restriction information is automatically made invalid, if it is detected that encryption information is notified to a user at the other end from the analysis result of the email, the access restriction device makes the access restriction information invalid and requests a change in the access restriction information from, for example, an administrator of the mail system.

For example, if an email with a file attached is sent, the access restriction device 10 according to the first embodiment described above records history of the access restriction information that was used for the access restriction process performed on the attached file. The access restriction device 10 includes a storing unit that stores therein an access restriction information allocation history master that records therein, in an associated manner, access restriction information that was used for the access restriction process performed on a file attached to an email and an email address of the transmission source of an email.

The access restriction device 10 compares, for each email, the analysis result of the email performed by the analyzing unit 12 with the record in the access restriction information allocation history master. If the access restriction information that was used in the access restriction process performed on the file is contained in the main body of the email that has the same email address of the transmission source as that of the email with the file subjected to the access restriction attached, the access restriction device 10 determines that notification of the access restriction information is to be made by using the email.

There may be a case in which, a character string that is the same as that in the access restriction information that was used for the access restriction process performed on a file may possibly be contained in the main body of an email and then be sent. Furthermore, if a character string, which is contained in the access restriction information that is used for the access restriction process performed on the file, is contained in the main body of an email, which has the same transmission-source email address as that of an email to which the file subjected to the access restriction is attached, there is a high possibility that the access restriction information is sent, as a notification, by using the email.

Furthermore, the structure that makes such unreliable access restriction information invalid may also individually be used in an access restriction device other than that according the embodiments described above, i.e., a conventional access restriction device.

Figure 10:
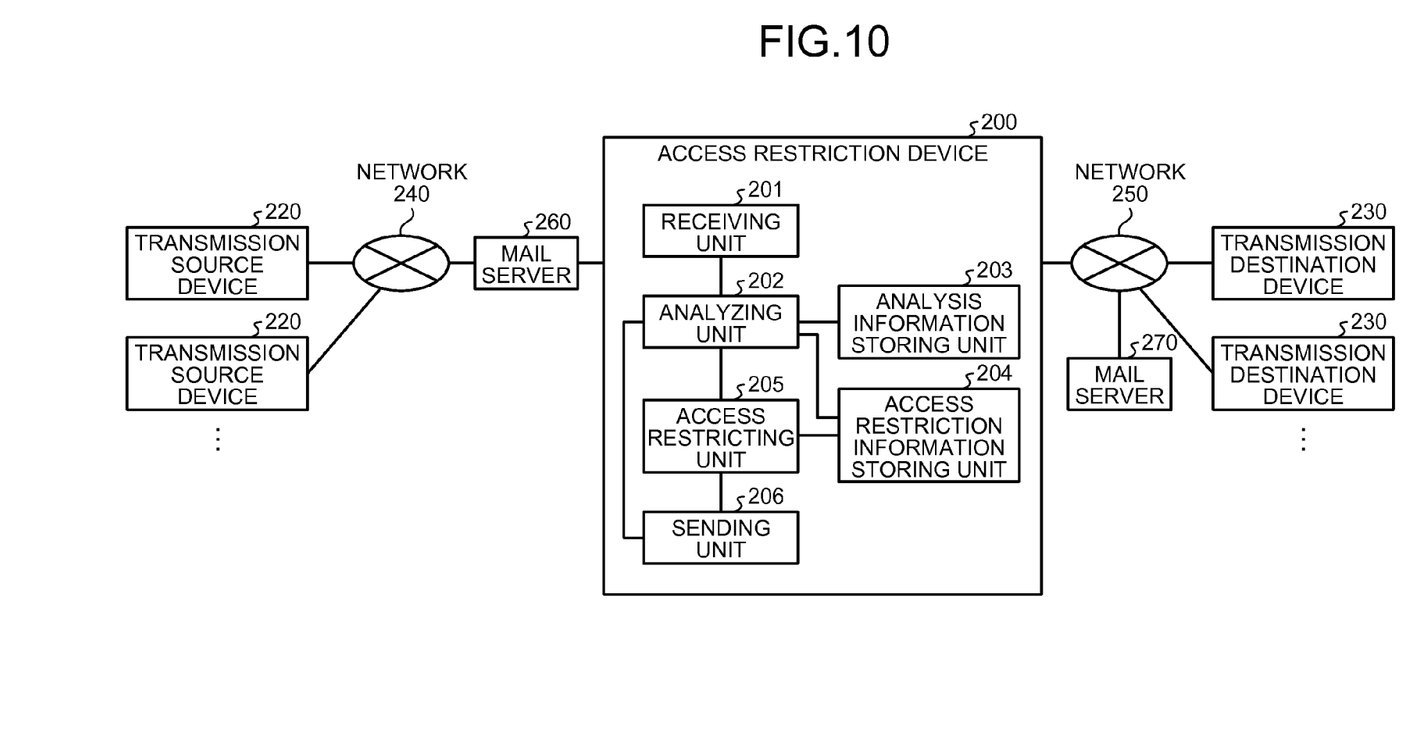
FIG. 10 is a schematic diagram illustrating an example configuration of a mail system according to a third embodiment.

Furthermore, for example, in the mail system according to the first embodiment described above, the description has been given of a case in which the gateway server corresponding to the access restriction device 10 has also the function of a mail server; however, a mail server may also be separately arranged from the gateway server, i.e., the access restriction device 10. FIG. 10 is a schematic diagram illustrating an example configuration of a mail system according to a third embodiment.

In the mail system illustrated in FIG. 10, an access restriction device 200, transmission source devices 220, transmission destination devices 230, a network 240, and a network 250 correspond to the access restriction device 10, the transmission source devices 20, the transmission destination devices 30, the network 40, and the network 50, respectively, according to the first embodiment illustrated in FIG. 1. An example configuration of the hardware of a computer that implements the access restriction device 200 is the same as that of the computer 1 illustrated in FIG. 2. However, in the third embodiment, in addition to the access restriction device 200, it is assumed that a mail server 260 inside the company and a mail server 270 outside the company are provided. The mail server 260 and the mail server 270 are always connected to the network and send and receive emails of users in the network of the mail server 260 and the mail server 270. For example, the mail server 260 and the mail server 270 have a function of sending emails to another network's users, a function of storing emails sent to users in the network of the mail server 260 and the mail server 270, and a function of allowing emails to be read in accordance with requests from users.

In the mail system in which the mail server 260 and the mail server 270 are arranged, the transmission source device 220 sends emails to the external mail server 270, in accordance with the destination, from the mail server 260 in the company via the access restriction device 200, i.e., a gateway server.

The access restriction device 200 includes a receiving unit 201, an analyzing unit 202, an analysis information storing unit 203, an access restriction information storing unit 204, an access restricting unit 205, and a sending unit 206. The functioning units in the access restriction device 200 correspond to the functioning units having the same name in the access restriction device 10 according to the first embodiment.

In the above, a description has been given of a case in which a mail server is provided in addition to the gateway server that corresponds to the access restriction device 200; however, the present invention is not particularly limited thereto. For example, the transmission source device 220 may also have the function performed by the mail server 260. Furthermore, for example, the transmission source device 220 may also have the function performed by the access restriction device 200.

The embodiments according to the present invention have been described; however, various modifications are of course possible as long as they do not depart from the spirit of the present invention.

According to an aspect of the access restriction device disclosed in the present invention, even when a file is erroneously attached to an email, it is possible to restrict the file from being read at a transmission destination.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An access restriction device comprising:
a processor; and
a memory that stores an access restriction process associated with a character string, wherein the processor executes a process comprising:
receiving an email from a transmission source;
analyzing information in a first file, when the first file is attached to the email, and specifying a character string from the first file;
specifying, the access restriction process associated with the character string stored in the memory;
generating a second file from the first file by executing the specified access restriction process on the first file;
attaching, instead of the first file attached to the email, the second file to the email; and
sending the email with the second file to a transmission destination of the email.

2. The access restriction device according to claim 1, wherein the access restriction process encrypts the first file by using an encryption key.

3. The access restriction device according to claim 1, wherein the access restriction process sets a password for the first file.

4. The access restriction device according to claim 1, wherein the character string is specified from a predetermined amount of the information acquired from beginning of the information in the first file.

5. The access restriction device according to claim 1, wherein
the memory stores the destination associated with the character string, and
the processor executes the process further comprising:
specifying a destination of the email; and
warning the transmission source when the destination associated with the character string stored in the memory is different from the destination of the email.

6. A non-transitory computer readable storage medium having stored therein an access restriction program causing a computer to execute an access restriction process with a character string, the process comprising:
receiving an email from a transmission source;
analyzing information in a first file, when the first file is attached to the email, and specifying a character string from the first file;
specifying the access restriction process associated with the character string stored in the memory;
generating a second file from the first file by executing the specified access restriction process on the first file;
attaching, instead of the first file attached to the email, the second file to the email; and
sending the email with the second file to a transmission destination of the email.

7. The non-transitory computer readable storage medium according to claim 6, wherein
the access restriction process encrypts the first file by using an encryption key.

8. The non-transitory computer readable storage medium according to claim 6, wherein
the access restriction process sets a password for the first file.

9. The non-transitory computer readable storage medium according to claim 6, wherein
the character string is specified from a predetermined amount of the information acquired from beginning of the information in the first file.

10. The non-transitory computer readable storage medium according to claim 6, wherein
the destination is associated with the character string, and
the process further comprises:
specifying a destination of the email; and
warning the transmission source when the destination associated with the character string stored in the memory is different from the destination of the email.

11. An access restriction method executed by a computer, the method being associated with a character string, the method comprising:
receiving, using a processor, an email from the transmission source;
analyzing, using the processor, information in a first file when the first file is attached to the email, and specifying, using the processor, a character string from the first file;
specifying, using the processor the access restriction process associated with the character string stored in the memory;
generating, using the processor, a second file from the first file by executing the specified access restriction process on the first file;
attaching, using the processor, instead of the first file attached to the email, the second file to the email; and
sending, using the processor, the email with the second file to a transmission destination of the email.

12. The access restriction method according to claim 11, wherein
the access restriction process encrypts the first file by using an encryption key.

13. The access restriction method according to claim 11, wherein
the access restriction process sets a password for the first file.

14. The access restriction method according to claim 11, wherein
the character string is specified from a predetermined amount of the information acquired from beginning of the information in the first file.

15. The access restriction method according to claim 11, wherein
the destination is associated with the character string, and
the method further comprises:
specifying, using a processor, a destination of the email; and
warning the transmission source when the destination associated with the character string stored in the memory is different from the destination of the email.

16. An access restriction device comprising:
a processor; and
a memory that stores an access restriction process associated with a user, wherein the processor executes a process comprising:
receiving an email from a transmission source;
analyzing a main body of a first file when the first file is attached to the email, and specifying, from an analysis result, a user who has reading authorization for the first file;
specifying the access restriction process associated with the user stored in the memory;
generating a second file from the first file by executing, on the first file, the access restriction process; and
attaching, instead of the first file attached to the email, the second file to the email; and
sending the email with the second file to a transmission destination of the email.

17. The access restriction device according to claim 16, wherein
the access restriction process encrypts the first file by using an encryption key.

18. The access restriction device according to claim 16, wherein
the access restriction process sets a password to the first file.

19. The access restriction device according to claim 16, wherein
the user is specified from a predetermined amount of the information acquired from beginning of the information in the first file.

20. The access restriction device according to claim 16, wherein
the memory stores the destination associated with the user, and
the processor executes the process further comprising:
specifying a destination of the email; and
warning the transmission source when the destination associated with the user stored in the memory is different from the destination of the email.

* * * * *